(12) United States Patent
Mohanty et al.

(10) Patent No.: US 7,837,779 B2
(45) Date of Patent: Nov. 23, 2010

(54) BIOADHESIVE FROM DISTILLERS' DRIED GRAINS WITH SOLUBLES (DDGS) AND THE METHODS OF MAKING THOSE

(75) Inventors: Amar K. Mohanty, Lansing, MI (US); Qiangxian Wu, East Lansing, MI (US); Abhishek Singh, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 0 days.

(21) Appl. No.: 12/587,929

(22) Filed: Oct. 15, 2009

(65) Prior Publication Data

US 2010/0031849 A1 Feb. 11, 2010

Related U.S. Application Data

(62) Division of application No. 11/707,375, filed on Feb. 16, 2007, now Pat. No. 7,618,660.

(60) Provisional application No. 60/774,838, filed on Feb. 17, 2006.

(51) Int. Cl.
*C09J 189/04* (2006.01)
*C09J 197/00* (2006.01)
(52) U.S. Cl. .................................. 106/134.1
(58) Field of Classification Search ............... 106/134.1
See application file for complete search history.

(56) References Cited

U.S. PATENT DOCUMENTS

| | | | |
|---|---|---|---|
| 4,912,209 A | 3/1990 | Leake et al. | |
| 5,096,491 A | 3/1992 | Nagai et al. | |
| 6,497,760 B2 | 12/2002 | Sun et al. | |
| 6,716,280 B2 | 4/2004 | Atkinson | |
| 6,843,888 B2 | 1/2005 | Merrette et al. | |
| 6,962,722 B2 * | 11/2005 | Dawley et al. | ................. 426/53 |
| 7,060,798 B2 | 6/2006 | Li et al. | |
| 7,081,159 B2 | 7/2006 | Thames et al. | |
| 2009/0069542 A1 * | 3/2009 | Yang et al. | ................... 530/373 |

OTHER PUBLICATIONS

Zhong, Z.K., Sun, X.S., Fang, X.H., Ratto, J.A., Int J. Adhes. 2002, 22(4) pp. 267-272.

Li, K.C., Peshkova, S., Geng, X.L., J. Am. Oil Chem. Soc. 2004, 81(5) pp. 487-491.

Cheng, E., Sun, X., Karr, G.S., Composites Part A: Applied Science and Manufacturing, 2004, (35) pp. 297-302.

Shukla, R. and Cheryan, M., Industrial Crops and Products. 2001 (13) pp. 171-192.

* cited by examiner

*Primary Examiner*—David M Brunsman
(74) *Attorney, Agent, or Firm*—Ian C. McLeod; Steven M. Parks

(57) ABSTRACT

A bioadhesive composition from distillers' dried grains with solubles (DDGS) is produced by reaction with an aqueous solution of a base, particularly, sodium hydroxide. Optionally, urea is included with the base. The bioadhesive composition is filtered as a solution from the residue of the reaction with the base. The bioadhesive composition is particularly useful as a boxboard glue.

20 Claims, 6 Drawing Sheets
(6 of 6 Drawing Sheet(s) Filed in Color)

Figure 1: Photograph of DDGS-based bioadhesive

Figure 2: A sample of corrugated board

Figure 3: Coated and non-coated sides of paperboard; (a): coated surface of paperboard, (b): non-coated surface of paperboard.

Figure 4: Test specimen for lap shear strength

Figure 5: Post lap shear testing mode of failure.
(a): Lap joint

Figure 6: The setup for curing; (a): Iron bar weighing 22 lbs placed over iron sheet for uniform distribution of load, (b): Paperboard samples, (c): Lap joint, (d): Iron sheet placed at top and bottom of samples

BIOADHESIVE FROM DISTILLERS' DRIED GRAINS WITH SOLUBLES (DDGS) AND THE METHODS OF MAKING THOSE

CROSS-REFERENCE TO RELATED APPLICATIONS

This application claims benefit to U.S. Provisional Application Ser. No. 60/774,838, filed Feb. 17, 2006 and is a division of U.S. application Ser. No. 11/707,375, filed Feb. 16, 2007, now U.S. Pat. No. 7,618,660, both of which are incorporated herein by reference in their entireties.

STATEMENT REGARDING FEDERALLY SPONSORED RESEARCH OR DEVELOPMENT

Not Applicable

BACKGROUND OF THE INVENTION (1) Field of the Invention

This invention relates to the preparation of a bioadhesive composition from the coproduct/byproduct of the dry milling corn ethanol industry e.g. distillers' dried grains with solubles (DDGS). The DDGS was treated with a strong aqueous alkali solution, with or without urea, filtered to remove insolubles and then concentrated by removing water to obtain a bioadhesive. The percent DDGS that can go into making the bioadhesive system is high. This bioadhesive composition shown in FIG. 1 has the strength to bind paperboard and corrugated paperboard. The DDGS-based bioadhesive applied to a corrugated paperboard is shown in FIG. 2. The bioadhesive composition has a high solid content and a low Brookfield viscosity, which is an advantage for paperboard binding.

(2) Description of the Related Art

Corn based ethanol industries are growing at a very fast rate in the United States. The two methods adopted in making bioethanol from corn are: dry milling and wet milling. In the United States, there are a larger number of the dry milling than the wet milling industries. Distillers' dried grains with solubles (DDGS) are the coproducts from the dry milling corn ethanol industries. The byproducts/coproducts of corn-based ethanol industries mostly go for low cost animal feeds.

Traditionally, starch is one of the main raw materials for preparing bioadhesive that is mainly used for binding papers or corrugated paperboards (U.S. Pat. No. 5,096,491 to Nagai et al; and U.S. Pat. No. 6,716,280 to Atkinson). Soy protein isolate-based adhesives had been studied (Zhong, Z. K., Sun, X. S., Fang, X. H., Ratto, J. A., Int. J. Adhesion and Adhesives 2002, 22 (4) pages 267-272; and Li, K. C., Peshkova, S., Geng, X. L., J. Am. Oil Chem. Soc. 2004, 81 (5) pages 487-491). U.S. Pat. No. 7,081,159 to Thames et al describes mixed water; zinc, soy protein or flour, strong base, such as sodium benzoate or sodium hydroxide, to prepare a bioadhesive by cooking processing. Urea, sodium dodecylbenzene sulfonate, sodium dodecyl sulfate, and guanidine hydrochloride were used by Sun et al (U.S. Pat. No. 6,497,760) to modify soy protein isolate for preparing protein-based adhesive. Soy protein isolate powder, NaOH and water were mixed followed by cooking to hydrolyze protein in preparing protein-based adhesive. These adhesives were used for bonding lignocellulosic composites (U.S. Pat. No. 7,060,798 to Li et al). Sodium hydroxide and urea are known for carrying out the destructurization of proteins (Cheng, E., Sun, X., Karr, G. S., Composites Part A: Applied Science and Manufacturing, 2004, (35) pages 297-302).

OBJECTS

It is an object of the present invention to prepare a low cost bioadhesive composition from distillers' dried grains with solubles (DDGS), particularly for use in paperboard binding. Further, it is an object of the present invention to provide a process and product which is prepared from a byproduct of ethanol production.

These and other objects will become increasingly apparent by reference to the following description and the drawings.

SUMMARY OF THE INVENTION

The present invention relates to a water dispersible bioadhesive composition which comprises a reaction product of:
 (a) hydrolyzed dried grain solids with a soluble fraction produced from a fermentation to produce ethanol; and
 (b) an aqueous solution of an inorganic base with heating to produce a solution of the water dispersible bioadhesive.

Preferably, the solids are distillers' dried grains with solubles from corn. Most preferably, the base is sodium hydroxide and potassium hydroxide. Further the grains have been hydrolyzed with a 0.2 to 1.6 M aqueous sodium hydroxide solution. Further the grain solids have been preferably hydrolyzed with a 0.5 to 1.0 M sodium hydroxide aqueous solution; then remaining solids have been filtered and removed to produce a resulting solution; and wherein the resulting solution is concentrated by partial removal of water to provide the composition.

The present invention relates to a process for producing a bioadhesive composition which comprises:
 (a) reacting an aqueous basic solution with dried grain solids with a soluble fraction produced from a fermentation to produce ethanol with an aqueous solution of a strong inorganic base; and
 (b) separating remaining solids from the solution and concentrating the solution to produce the bioadhesive composition.

Preferably, the solids are distillers' dried grains with solubles from corn. Most preferably, the solids are hydrolyzed with an aqueous solution of sodium hydroxide as the base. Further, the solids are hydrolyzed with the sodium hydroxide, the remaining solids are filtered and removed to produce a resulting solution and wherein the resulting solution is concentrated by partial removal of water. Still further, urea is provided in the aqueous solution of the base. Further, the urea is provided in the aqueous solution of the base. Still further, the urea is present in an amount between about 0.01 and 5.6% by weight of the solution. Further, the urea is preferably present in an amount between about 1.9 and 3.8% by weight of the solution. Still further, the base is an alkali metal base and is between about 0.2 and 1.6 M. Further, preferably the base is an alkali metal base between about 0.5 and 1.0 M. Still further, the heating is at a temperature between about 50 and 130° C. and a pressure of about 1.0 to 3.0 atmospheres. Finally, wherein the heating is preferably at a temperature of between about 50 and 110° C. and a pressure of 1.0 to 2.0 atmospheres.

It is very important for the sustainable development of the ethanol industries to find a value added application for DDGS. DDGS has chemically degraded preferably by strong alkali such as sodium hydroxide (NaOH), to produce the bioadhesive composition. Other water soluble alkali compounds are for instance, potassium hydroxide.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF THE PREFERRED EMBODIMENTS

Materials

Figure 1:
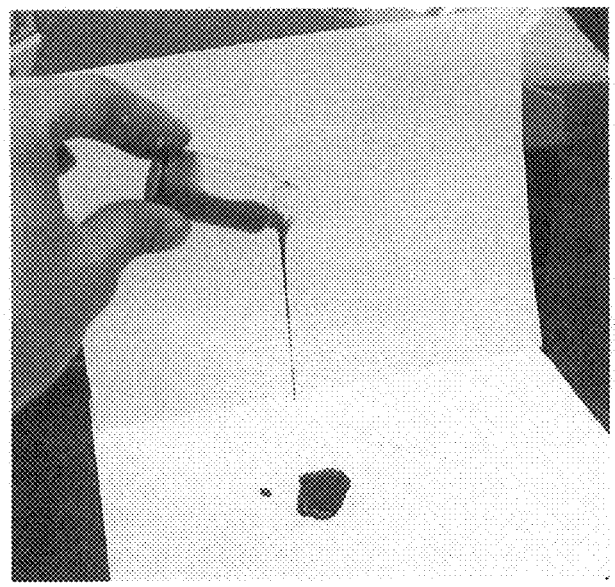
FIG. 1 shows a photograph of DDGS-based bioadhesive.
Figure 2:
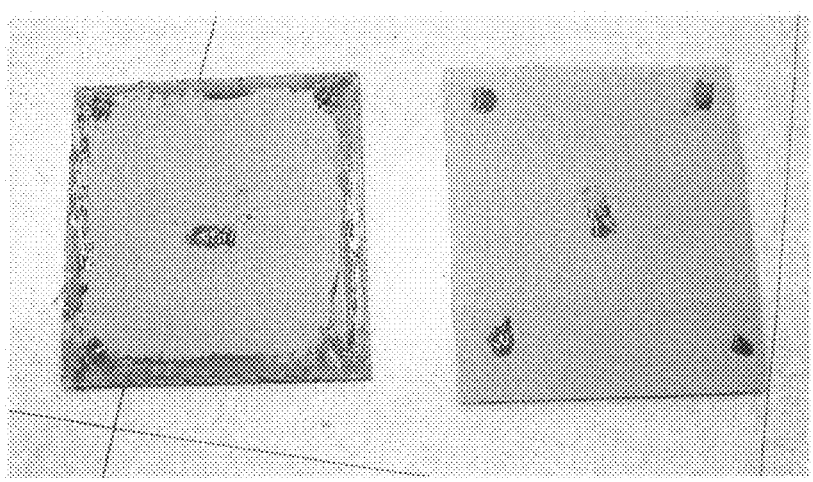
FIG. 2 shows a sample of corrugated board.

Sodium hydroxide (NaOH) and potassium hydroxide (KOH) were obtained from Columbus Chemical Industries, Inc. (Columbus, Wis.). Urea was obtained from Spectrum Quality Products, Inc. (Gardena, Calif.). Distillers' dried grains with solubles (received DDGS contains 9% moisture) were obtained from Michigan Ethanol (Caro, Mich.). The bioadhesive compositions were prepared from as received DDGS. The protein content of the DDGS was measured to be 27% using a Perkin-Elmer nitrogen/protein analysis instrument (CHN 2400, Series II CHNS/O). Protein Glue (Ground Hide Glue, Item #TAD032001) and precooked wheat starch (Wheat Paste No. 301, Item #TAD002001) were obtained from Talas, N.Y. Paperboard: Custum Kote® from Mead Westvaco, the thickness of paperboard was 18 mil, having white coating on one side for printing purposes while the other side was brown. In the Examples, the yields are averaged over 2 to 4 trials.

Preparation of Bioadhesive from DDGS

Examples 1-6

Effects of NaOH and Urea

NaOH and urea were dissolved in distilled water to prepare a NaOH-urea solution. 140 mL of the NaOH-urea solution containing NaOH (0~5.6 g), Urea (0~4.2 g) and water (131.6 g), were mixed with 30 g of DDGS. The resulting slurry was cooked in a pressure cooker (MAXI-MATIC® EC-8, Maxi-matic Appliances Industry, CA) for 15 minutes. The cooking pressure as calculated was 1.6 atmospheres. The cooked slurry was diluted using about 50 g of water followed by filtration under vacuum using Buckner funnel that is mounted over an Erlenmeyer flask. In this filtration process, a polyester-cotton cloth was used as the filtering medium. After filtration, the solid residues were retained over the cloth while suspension was collected in the Erlenmeyer flask. The residues were washed with distilled water (about 200 g) for 10 min and filtered again. The washed residues were collected and dried at 110° C. The suspension was charged into a three-necked flask and concentrated at 100° C. for about 4 hours to evaporate most part of water. The concentrated suspension was a brown and viscous fluid, which was considered as the bioadhesive from DDGS.

Example 7

Using NaOH and Urea at Ambient Pressure, No Use of Pressure Cooker 140 mL of the NaOH-urea solution containing NaOH (4.2 g), Urea (4.2 g) and water (131.6 g), were mixed with 30 g of DDGS. The slurry was cooked at ambient atmosphere (1.0 atm) for 15 minutes. The cooked slurry was diluted using about 50 g of water followed by filtration under vacuum using Buckner funnel that is mounted over an Erlenmeyer flask. In this filtration process, a polyester-cotton cloth was used as the filtering medium. After filtration, the solid residues were retained over the cloth while suspension was collected in the Erlenmeyer flask. The residues were washed with distilled water (about 200 g) for 10 min and filtered again. The washed residues were collected and dried at 110° C. The suspension was charged into a three-necked flask and concentrated at 100° C. for about 4 hours to evaporate most part of water. The concentrated suspension was a brown and viscous fluid, which was the bioadhesive composition from DDGS.

Example 8

Using Only NaOH Under Atmospheric Conditions, No Use of Pressure Cooker 140 mL of the NaOH solution containing NaOH (4.2 g) and water (135.8 g) were mixed with 30 g of DDGS. The slurry was cooked at ambient atmosphere (1.0 atm) for 15 minutes. The cooked slurry was diluted using about 50 g of water followed by filtration under vacuum using Buckner funnel that is mounted over an Erlenmeyer flask. In this filtration process, a polyester-cotton cloth was used as the filtering medium. After filtration, the solid residues were retained over the cloth while suspension was collected in the Erlenmeyer flask. The residues were washed with distilled water (about 200 g) for 10 min and filtered again. The washed residues were collected and dried at 110° C. The suspension was charged into a three-necked flask and concentrated at 100° C. for about 4 hours to evaporate most part of the water. The concentrated suspension was a brown and viscous fluid, which was the bioadhesive composition from DDGS.

Examples 9 and 10

Effects of Cooking Time 140 mL of the NaOH-urea solution containing NaOH (4.2 g), Urea (4.2 g) and water (131.6 g), were mixed with 30 g of DDGS. The slurry was cooked in a pressure cooker (MAXI-MATIC® EC-8, Maxi-matic Appliances Industry, CA) for 25 minutes as shown in Example 9 of Table 1 or 35 min as shown in Example 10 of Table 1. The cooking pressure was 1.6 atmospheres. The cooked slurry was diluted using about 50 g of water followed by filtration under vacuum using Buckner funnel that is mounted over an Erlenmeyer flask. In this filtration process, a polyester-cotton cloth was used as the filtering medium. After filtration, the solid residues were retained over the cloth while suspension was collected in the Erlenmeyer flask. The residues were washed with distilled water (about 200 g) for 10 min and filtered again. The washed residues were collected and dried at 110° C. The suspension was charged into a three-necked flask and concentrated at 100° C. for about 4 hours to evaporate most part of the water. The concentrated suspension was a brown and viscous fluid, which was considered as the bioadhesive from DDGS.

Examples 11 and 12

Control Experiments

As a control, commercial precooked starch adhesive powder was mixed with water at room temperature to prepare starch adhesive. The properties of the starch adhesive were shown in Example 11 of Table 1. Commercial protein adhesive was heated at 70° C. for 10 min in water to prepare protein adhesive. The properties of the protein adhesive were shown in Example 12 of Table 1.

TABLE 1

Effects of processing recipes on the yield and lapshear strength of the bioadhesive

| Example No. | Received DDGS (g)[a] | NaOH (g) | Urea (g) | Cooking time (min) | Cooking pressure (atmosphere) | Bioadhesive yield[d] (%) on received | Lapshear strength (psi) |
|---|---|---|---|---|---|---|---|
| 1 | 30.0 | 0 | 4.2 | 15 | 1.6 | —[b] | — |
| 2 | 30.0 | 1.4 | 4.2 | 15 | 1.6 | 13 ± 1.55 | 93 ± 11 |
| 3 | 30.0 | 2.8 | 4.2 | 15 | 1.6 | 57 ± 1.52 | 135 ± 7 |
| 4 | 30.0 | 4.2 | 4.2 | 15 | 1.6 | 67 ± 0.77 | 127 ± 7 |
| 5 | 30.0 | 5.6 | 4.2 | 15 | 1.6 | 70[c] ± 0.78 | 113 ± 2 |
| 6 | 30.0 | 4.2 | 0 | 15 | 1.6 | 67 ± 0.80 | 123 ± 7 |
| 7 | 30.0 | 4.2 | 4.2 | 15 | 1.0 | 67 ± 1.6 | 129 ± 3 |
| 8 | 30.0 | 4.2 | 0 | 15 | 1.0 | 67 ± 0.28 | 129 ± 7 |
| 9 | 30.0 | 4.2 | 4.2 | 25 | 1.6 | 68[c] ± 0.35 | — |
| 10 | 30.0 | 4.2 | 4.2 | 35 | 1.6 | 69[c] ± 0.87 | — |
| 11-starch | — | — | — | — | — | — | 114 ± 6 |
| 12-protein | — | — | — | — | — | — | 127 ± 7 |

[a] the moisture content of the received DDGS is 9%.
[b] not available.
[c] yields based on average of 2 batches of experiments.
[d] yields data are based on average of at least 3 batches of experiments or otherwise stated.

TABLE 2

Effect of KOH on the yield of the bioadhesive

| Example No. 13 | Received DDGS (g) | KOH (g) | Urea (g) | Cooking time (min) |
|---|---|---|---|---|
| 13 | 30 | 4.2 | 0.0 | 15 |

| Example No. 13 | Cooking pressure (atmosphere) | Bioadhesive yield (%) | Lapshear strength (psi) |
|---|---|---|---|
| 13 | 1.6 | 53 | 109 ± 6 |

[a] yields are based on average of 2 batches of experiments

Example 13

Effect of KOH 140 mL of the KOH solution containing KOH (4.2 g) and water (135.8 g) were mixed with 30 g of DDGS to form slurry. The slurry was cooked for 15 minutes. The cooking pressure as calculated was 1.6 atmospheres. The cooked slurry was diluted using about 50 g of water followed by filtration under vacuum using Buckner funnel that is mounted over an Erlenmeyer flask. In this filtration process, a polyester-cotton cloth was used as the filtering medium. After filtration, the solid residues were retained over the cloth while suspension was collected in the Erlenmeyer flask. The residues were washed with distilled water (about 200 g) for 10 min and filtered again. The washed residues were collected and dried at 110° C. The suspension was charged into a three-necked flask and concentrated at 100° C. for about 4 hours to evaporate most part of the water. The concentrated suspension was a brown and viscous fluid, which was considered as the bioadhesive from DDGS as shown in Table 2.

Example 14

Effect of Squeezed Filtration

NaOH was dissolved in distilled water to prepare a NaOH solution. 140 mL of the NaOH solution containing NaOH (4.2 g) and water (135.8 g) were mixed with 30 g of DDGS to form slurry. The slurry was cooked at ambient atmosphere (1.0 atm) for 15 minutes. The cooked slurry was collected in a polyester-cotton cloth and squeezed by hands thereby separating solid residues (retained in the filter cloth) from aqueous suspension. The residues were washed by use of distilled water (about 200 g) for 10 min. and squeezed again. The residue was finally collected and dried at 110° C. to obtain dried residues. The suspension was charged into a three-necked flask and concentrated at 100° C. for about 4 h to evaporate most part of the water. The concentrated suspension was a brown and viscous fluid, which was considered as the bioadhesive from DDGS as shown in Table 3.

TABLE 3

Effect of squeezing processing on the yield of the bioadhesive

| Example No. | Received DDGS (g) | NaOH (g) | Urea (g) | Cooking time (min) |

TABLE 3-continued

Effect of squeezing processing on the yield of the bioadhesive

| 14 | 30 | 4.2 | 0.0 | 15 |
| 15 | 30 | 4.2 | 4.2 | 15 |

| Example No. | Cooking pressure (atmosphere) | Bioadhesive yield[a] (%) | Lapshear strength (psi) |
|---|---|---|---|
| 14 | 1 | 83 | 111 ± 7 |
| 15 | 1.6 | 81 | 111 ± 7 |

[a]yield based on average of two samples

Example 15

Effect of Squeezed Filtration Pressure Cooker 40 mL of the NaOH-urea solution containing NaOH (4.2 g) and urea (4.2 g) and water (131.6 g) were mixed with 30 g of DDGS to form slurry. The slurry was cooked using the pressure cooker. The cooking pressure was 1.6 atmospheres. The cooked slurry was collected in a polyester-cotton cloth and squeezed by hands thereby separating solid residues (retained in the filter cloth) from aqueous suspension. The residues were washed by use of distilled water (about 200 g) for 10 min. and squeezed again. The residue was finally collected and dried at 110° C. to obtain dried residues. The suspension was charged into a three-necked flask and concentrated at 100° C. for about 4 h to evaporate most part of the water. The concentrated suspension was a brown and viscous fluid, which was considered as the bioadhesive from DDGS as shown in Table 3.

Characterization
(1) Yield of DDGS Bioadhesive

The yield of the bioadhesive composition in this invention is based on the amount of DDGS that was converted into bioadhesive systems (Examples 1 to 15 as discussed above). The yield is calculated by using the following equation:

Yield of bioadhesive (%)=100−(Weight of dried residues/initial weight of the as received DDGS taken)×100     (1)

For example, the dried residue in Example 4 was 10.0 g, and thus the yield of the bioadhesive (%) as calculated was =100×{1−(10.0 g/(30.0 g)}=67%.

(2) Water Content Measurement:

Weighed sample ($W_1$) was dried in an oven at 110° C. Eight hours later, the dried sample was taken out and weighed ($W_2$). Water content of the sample is calculated using the following equation:

Water %=$[W_1-W_2]/W_1$×100     (2)

(3) Cooking Pressure Measurement:

Pressure cooker operates at a constant pressure which is maintained by periodic discharge of steam through a nozzle over which a weight rests. The cooking pressure is calculated by using the following equation:

Cooking pressure (atm)=weight over the nozzle/the area of the nozzle cross section.     (3)

Figure 3:
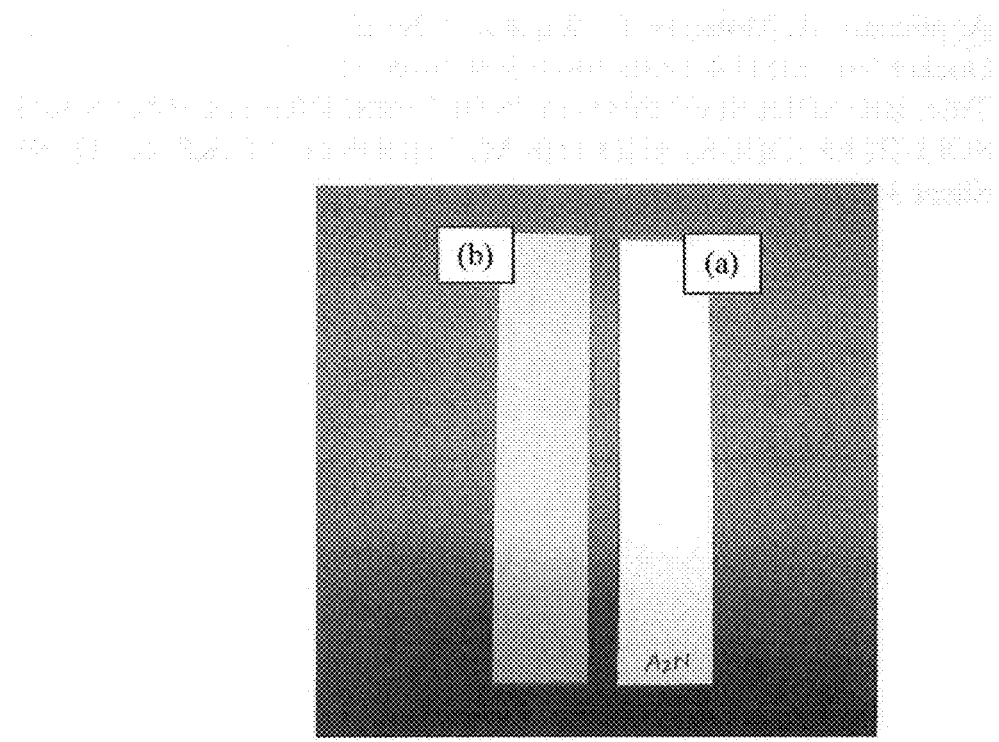
FIG. 3 shows coated and non-coated sides of paperboard; (a): coated surface of paperboard, (b): non-coated surface of paperboard.
Figure 4:
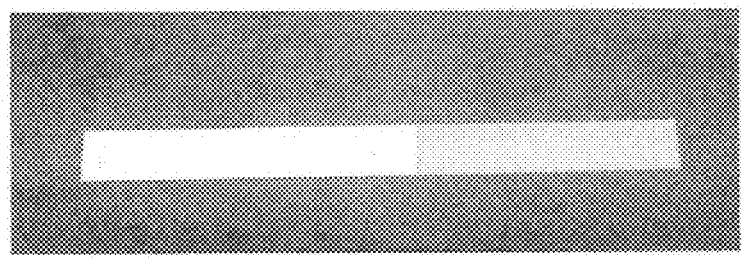
FIG. 4 shows a test specimen for lap shear strength.
Figure 5:
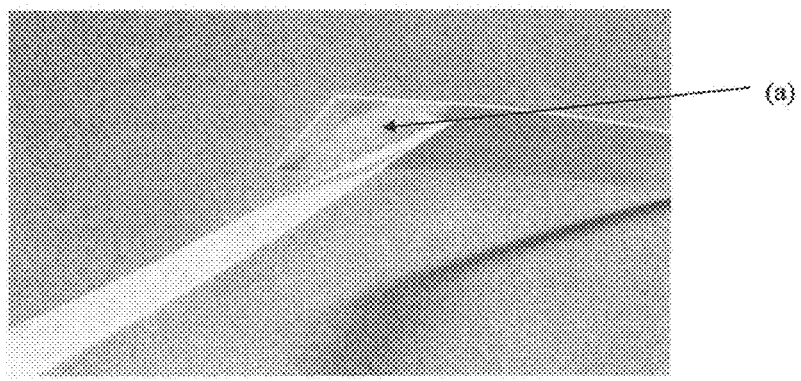
FIG. 5 shows post lap shear testing mode of failure. (a): Lap joint.
Figure 6:
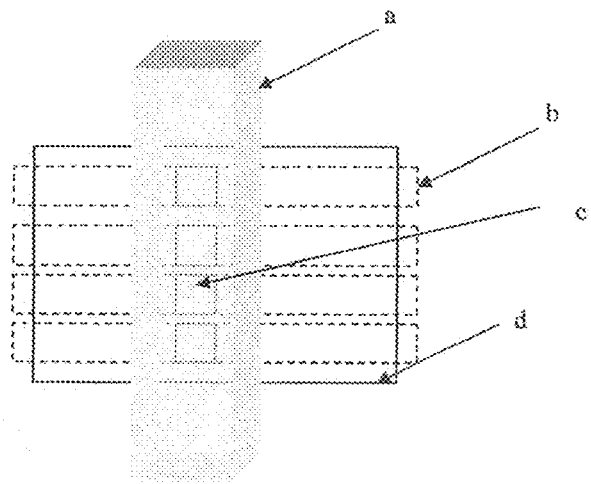
FIG. 6 shows a setup for curing as in Example 1; (a): Iron bar weighing 22 lbs placed over iron sheet for uniform distribution of load, (b): Paperboard samples, (c): Lap joint, (d): Iron sheet placed at top and bottom of samples.

(4) Lapshear Strength:

Lapshear samples were prepared from paperboard that was cut into rectangular strips as shown in FIG. 3; two such strips were bonded with bioadhesive having 50% of solid content. Bioadhesive was applied to only one of the paperboard strips having a spread area of 1 square inch containing 0.053 g of adhesive on wet basis. The adhesive was applied to bind the non-coated sides of the paperboard. Bonded paperboard samples as shown in FIG. 4, were pressed and cured for around 9 hours time at ambient conditions. The bonded paperboards were subjected for lapshear strength testing. Failure of lap joint during testing of lap shear specimens is shown in FIG. 5. The testing details were provided in standard of TAPPI T813 for paper samples. Samples were tested at a cross head speed of 0.5 inch per min. In regard to the curing of paperboard specimens for lapshear testing, the prepared samples were placed between two thin metal sheets with dimensions 10"×10". Pressure was applied to the specimens by placing a rectangular iron slab weighing 22 lbs over the lap joints which were sandwiched between metal sheets. Set up for curing is shown in FIG. 6. Under these conditions, samples were allowed to dry for about 9 hrs. Curing conditions for commercial samples were kept the same as that of other bioadhesives made from DDGS. Then the lap shear strength was measured.

Solid content in the bioadhesive compositions were maintained as 50% and the method is explained as follows: The bioadhesive composition was concentrated until the water content of the adhesive was lower than 50%. The water content of the bioadhesive ($W_i$) was measured. Then the adhesive was weighed ($W_{adhesive}$) and added with distilled water to adjust the total water content to be 50%. The 50% starch slurry has no spread ability thus, for convenience, a 25 wt % starch slurry was prepared. In order to keep the amount of solid content consistent with bioadhesive, the wet amount of starch adhesive was doubled over the lap area.

(5) Viscosity Measurements

Brookfield viscosities of bioadhesive compositions with various solid contents were measured using a Brookfield digital viscometer (Model DV-II, Brookfield Engineering Laboratories Inc. (Stoughton, Mass.)) with a thermal cell attachment. Spindle number is 21. Sample (8-13 mL) was poured into a vessel at a given temperature. After the samples were equilibrated in the thermal cell for 10 min, the motor of the viscometer was turned on to record Brookfield viscosity at a given speed.

Effects of Processing Recipes on the Yield and Lapshear Strength of the Bioadhesive The effects of processing recipes on the yield and lapshear strength of the bioadhesive are shown in Table 1.

In Example 1, when only urea was added into the cooking compound system, the bioadhesive composition could not be obtained and the yield data was not available. This indicates that bioadhesive composition can not be made if only urea is used.

In Example 6, NaOH was added into the cooking compound system. In this case, urea was not used. The bioadhesive yield was 67%, indicating that NaOH is a necessary chemical to degrade the raw DDGS into water-soluble adhesive.

In Examples 2, 3, 4 and 5, the bioadhesive yield increased from 13 to 70.0% with an increase of NaOH content from 1.4 g/30 g of DDGS to 5.6 g/30 g of received DDGS, suggesting that the yield of the bioadhesive is dependent on the NaOH content.

Conclusion: NaOH or another basic compound chemical is necessary to prepare the bioadhesive composition.

The difference between Examples 4 and 6 is that urea was used in Example 4 but was not in Example 6. However, the bioadhesive composition yield and lapshear strength for Example 4 were nearly same to that of Example 6.

Conclusion: Urea was considered not to be necessary to improve the yield or lap strength of the bioadhesive.

However, urea may improve other properties of the bioadhesive such as durability over time.

In Example 7, the pressure cooker was not used to prepare the bioadhesive composition and thus, the processing pressure was 1 atmosphere. The properties (yield and lap shear strength) of the bioadhesive composition were almost the same as that of the adhesive in Example 4 in which a pressure cooker was used to produce 1.6 atmosphere pressures. This indicates that the given processing pressure is not an essential factor to improve the properties of the bioadhesive composition. In studying the effect of varying cooking time (15, 25 and 35 minutes) within Examples 4, 9 and 10, the bioadhesive composition yields were nearly the same. Thus, 15 minutes is the preferred time for bioadhesive compositions under the reporting processing conditions. These results suggest that the yield of the bioadhesive composition is not significantly improved by increasing the given cooking time.

Conclusion: The yield of the bioadhesive is not improved by increasing the given cooking time from 15 to 25 and 35 minutes.

Comparing Example 6 and Example 8, the bioadhesive composition of the former was obtained using only NaOH and a pressure cooker (1.6 atm.), and the bioadhesive composition of the latter was obtained using only NaOH at 1.0 atmosphere. The yield data of both of the two samples were nearly the same while lap shear strength shows marginal improvement, suggesting that the given cooking pressure could not improve the properties of the adhesive further.

Summarily, the formulation in Example 8 is preferred in practice under the present inventions.

In Examples 11 and 12, the lapshear strength of the starch adhesive and protein adhesive were 114 psi and 127 psi, respectively. The lapshear strength of the bioadhesive composition in Example 8 is slightly higher than that of the two control samples indicating that the bioadhesive composition has desired binding strength comparable to the commercial starch or protein adhesive for binding paperboards.

Conclusion: The DDGS-based bioadhesive composition showed competitive lapshear strength data for binding paperboards as compared herewith the commercial starch or protein adhesive.

Viscosity Properties of the Bioadhesive

Brookfield viscosity results of the bioadhesive composition in Example 4 at 25° C. at varying solid contents are shown in Table 4.

The starch adhesive with 50% of solid content is a gel with no flowability characteristics. The starch had to be diluted typically to low solid content (about 5%) to have suitable viscosity thus to spread uniformly over the paperboard for adhesion purpose. The starch-based adhesive should be heated up to about 100° C. to decrease the viscosity in practice (U.S. Pat. No. 4,912,209 to Leake et al). The main challenge for the starch-based adhesive as to be used in paper industry is to have optimal or low viscosity at high solid content of the adhesive (U.S. Pat. No. 5,096,491 to Nagai et al). A Brookfield viscosity (U.S. Pat. No. 6,843,888 to Merrette et al) of waxy starch paste with 3% of solid content at 95° C. was 475 cps. The viscosities of the DDGS-based bioadhesive composition in Example 4 with 30% of solid content ranged from 108 to 240 cps (Table 4), suggesting that the DDGS-based bioadhesive composition has low viscosity even with high solid content.

TABLE 4

Brookfield viscosity of the adhesive in Example 4 at 25° C. at varying solid concentrations

| Shear rate (second$^{-1}$) | Viscosity (cps) of bioadhesive with 50% solid content | Viscosity (cps) of bioadhesive with 40% solid content | Viscosity (cps) of bioadhesive with 30% solid content |
|---|---|---|---|
| 49.65 | 2200 | 2080 | 240 |
| 99.3 | 2000 | 1960 | 160 |
| 198.6 | 1550 | 1860 | 140 |
| 496.5 | — | 1710 | 112 |
| 993 | — | 1580 | 108 |

Conclusion: The DDGS-based bioadhesive composition shows low Brookfield viscosity at high solid content.

Effects of Curing Time on the Lap-Shear Strength of the Bioadhesive

Effect of curing temperature and time on the lap-shear strength of the bioadhesive composition in Example 4 is shown in Table 5. It can be concluded that the preferred curing time at ambient conditions is 5-9 h, more preferably, 6 h under present experimental conditions.

Conclusion: The optimal curing time at ambient conditions with given pressure is about 6 hours.

TABLE 5

Effect of curing temperature and time on the lap-shear strength (psi) of the bioadhesive in Example 4

| Temperature (° C.) | Time (hours) | | | | |
|---|---|---|---|---|---|
| | 2 | 4 | 6 | 9 | 12 |
| 23° C. | —$^a$ | — | 119 ± 13 | 127 ± 7 | 130 ± 4 |
| 80° C. | 104 ± 9 | 116 ± 5 | 115 ± 4 | — | — |

$^a$not available.

The bioadhesive composition is made from an inexpensive coproduct DDGS for the first time. The materials used including DDGS and alkali are cost effective and affordable. The processing procedure is quite simple.

The viscosity of this DDGS bioadhesive composition with high solid content is low. This is an important advantage for the adhesive to be used for the paperboard binding. The low viscosity adhesive, with high solid content, makes it possible to dry the adhesive quickly. This practice can save energy in drying. Faster drying of adhesives can lead to higher paperboard binding production rates. Higher solid content of bioadhesive composition can minimize the paperboard warp due to comparatively less moisture.

The bioadhesive composition can be modified by various protein modifiers such as urea. U.S. Pat. No. 6,497,760 to Sun et al describes protein modifiers and is incorporated herein by reference in its entirety. Also, organic solvents can be added to facilitate drying. The DDGS can be milled to a fine powder. This can help in processing. Also, the DDGS can be treated for several hours and the cooked. It is preferred to stir during the cooking.

DDGS typically contains 27% proteins, around 13% oils, and more than 50% carbohydrates (Shukla, R., Cheryan, M., Ind. Crops Prod. 2001, 13, pages 171-192). As claimed in this invention, DDGS was hydrolyzed by NaOH aqueous solution. The proteins, oils, and most parts of fibers (polysaccharides) are expected to be degraded into low molecular weight components. Therefore, the DDGS-based bioadhesive is a complex mixture of water, hydrolyzed proteins, hydrolyzed oils and hydrolyzed polysaccharides. This bioadhesive can be classified as hybrid adhesive containing chemically modified carbohydrates and protein as main components. The chemical reactions including denaturation and hydrolysis of DDGS are likely to form the low molecular weight compounds. The observed viscosity of the bioadhesive is low because of the molecular weight of DDGS-based adhesives are lower than that of starch or protein based adhesives.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

We claim:

1. A water dispersible bioadhesive composition which comprises a reaction product of:
   (a) distillers' dried grains with solubles (DDGS) heated with
   (b) an aqueous solution of an inorganic base;
   wherein the water dispersible bioadhesive composition is in the form of an aqueous mixture comprising the reaction product.

2. The composition of claim 1 wherein the DDGS comprises corn DDGS.

3. The composition of claim 1 wherein the inorganic base is sodium hydroxide.

4. The composition of claim 1 wherein the inorganic base is potassium hydroxide.

5. The composition of claim 1 wherein the reaction product comprises DDGS hydrolyzed with a 0.2 to 1.6 M aqueous sodium hydroxide solution as the aqueous solution of the inorganic base.

6. The composition of claim 5 wherein the aqueous mixture comprising the reaction product has been filtered and concentrated by partial removal of water to provide the water dispersible bioadhesive composition.

7. The composition of claim 1, further comprising urea in an amount between about 0.01 and 5.6% by weight of the aqueous mixture.

8. The composition of claim 1 wherein the inorganic base is an alkali metal base and has a concentration between about 0.2 and 1.6 M in the aqueous solution.

9. The composition of claim 1 wherein the reaction product of DDGS heated with the aqueous solution of the inorganic base is formed at a temperature between about 50 and 130° C. and a pressure between about 1.0 to 3.0 atmospheres.

10. The composition of claim 1 wherein the water dispersible bioadhesive composition has a solid content ranging from about 30 wt. % to about 50 wt. %.

11. The composition of claim 10 wherein the water dispersible bioadhesive composition is flowable at 25° C.

12. The composition of claim 1 wherein the water dispersible bioadhesive composition has a solid content ranging from about 40 wt. % to about 50 wt. %.

13. The composition of claim 12 wherein the water dispersible bioadhesive composition is flowable at 25° C.

14. A water dispersible bioadhesive composition which comprises a reaction product of:
   (a) distillers' dried corn grains with solubles (corn DDGS) heated with
   (b) an aqueous solution comprising an alkali metal base;
   wherein the water dispersible bioadhesive composition is in the form of an aqueous mixture comprising the reaction product, the reaction product comprising (i) hydrolyzed corn DDGS proteins, (ii) hydrolyzed corn DDGS oils, and (iii) hydrolyzed corn DDGS polysaccharides.

15. The composition of claim 14, further comprising urea.

16. The composition of claim 14 wherein the water dispersible bioadhesive composition has a solid content ranging from about 30 wt. % to about 50 wt. %.

17. The composition of claim 16 wherein the water dispersible bioadhesive composition is flowable at 25° C.

18. The composition of claim 14 wherein the water dispersible bioadhesive composition has a solid content ranging from about 40 wt. % to about 50 wt. %.

19. The composition of claim 18 wherein the water dispersible bioadhesive composition is flowable at 25° C.

20. A water dispersible bioadhesive composition comprising:
   an aqueous mixture comprising water and base-hydrolyzed distillers' dried grains with solubles (DDGS), the base-hydrolyzed DDGS comprising (i) hydrolyzed DDGS proteins, (ii) hydrolyzed DDGS oils, and (iii) hydrolyzed DDGS polysaccharides.

* * * * *